United States Patent
Tomita

Patent Number: 6,067,143
Date of Patent: May 23, 2000

[54] HIGH CONTRAST MICRO DISPLAY WITH OFF-AXIS ILLUMINATION

[76] Inventor: Akira Tomita, 929 Whitehall La., Redwood City, Calif. 94061

[21] Appl. No.: 09/090,749

[22] Filed: Jun. 4, 1998

[51] Int. Cl.[7] ..................... G02F 1/1343; G02F 1/1333; F21X 7/04

[52] U.S. Cl. ................ 349/143; 349/62; 349/64; 349/146; 362/31

[58] Field of Search .................. 362/31, 32; 399/61, 399/62, 65, 69, 66, 68, 64; 349/143, 146

[56] References Cited

U.S. PATENT DOCUMENTS

| | | | |
|---|---|---|---|
| 3,863,246 | 1/1975 | Trcka et al. | 340/324 R |
| 3,918,795 | 11/1975 | Lindner et al. | 350/103 |
| 3,922,065 | 11/1975 | Schultz | 350/103 |
| 3,935,359 | 1/1976 | Rowland | 428/172 |
| 4,021,945 | 5/1977 | Sussman | 40/28 C |
| 4,435,047 | 3/1984 | Fergason | 350/334 |
| 4,440,474 | 4/1984 | Trcka | 350/345 |
| 4,464,014 | 8/1984 | Sick et al. | 350/105 |
| 4,685,771 | 8/1987 | West et al. | 350/347 |
| 4,703,999 | 11/1987 | Benson | 350/103 |
| 4,712,867 | 12/1987 | Malek | 350/103 |
| 4,712,868 | 12/1987 | Tung et al. | 350/105 |
| 4,725,494 | 2/1988 | Belisle et al. | 428/325 |
| 4,732,456 | 3/1988 | Fergason et al. | 350/334 |
| 4,775,219 | 10/1988 | Appeldorn et al. | 350/103 |
| 4,895,428 | 1/1990 | Nelson et al. | 350/103 |
| 4,938,563 | 7/1990 | Nelson et al. | 350/103 |
| 4,957,335 | 9/1990 | Kuney, Jr. et al. | 350/105 |
| 4,988,541 | 1/1991 | Hedblom | 427/163 |
| 4,992,201 | 2/1991 | Pearlman | 252/299.1 |
| 5,076,668 | 12/1991 | Dalisa et al. | 359/51 |
| 5,377,027 | 12/1994 | Jelley et al. | 349/61 |
| 5,398,081 | 3/1995 | Jones | 348/742 |
| 5,405,551 | 4/1995 | Reamey et al. | 252/299.01 |
| 5,408,344 | 4/1995 | Takiguchi et al. | 359/40 |
| 5,528,709 | 6/1996 | Koike et al. | 385/14 |
| 5,585,947 | 12/1996 | Havens et al. | 349/92 |
| 5,886,759 | 3/1999 | Mashino et al. | 349/65 |

FOREIGN PATENT DOCUMENTS

| | | | |
|---|---|---|---|
| 0313053 A2 | 4/1989 | European Pat. Off. | G02F 1/133 |
| 0693703 | 1/1996 | European Pat. Off. | G02F 1/1333 |

*Primary Examiner*—William L. Sikes
*Assistant Examiner*—Toan Ton

[57] ABSTRACT

A liquid crystal display of improved contrast is provided. Image contrast is determined by the ratio of light from the display pixels that are in an on state to the light from the display pixels that are in an off state. The disclosed system improves on the image contrast by selecting the illumination direction and the panel orientation in such a way as to minimize the amount of light entering the viewing field that is due to scattered and/or diffracted light from the fine features of the display panel.

23 Claims, 7 Drawing Sheets

HIGH CONTRAST MICRO DISPLAY WITH OFF-AXIS ILLUMINATION

TECHNICAL FIELD OF THE INVENTION

The present invention relates generally to liquid crystal display panels and, more particularly, to a method and apparatus for increasing the contrast and over-all image quality of a liquid crystal display panel.

BACKGROUND OF THE INVENTION

Light valves having an electro-optically active element comprising a liquid crystal composite have been used in displays (directly driven, passive matrix, and active matrix addressed), windows, and privacy panels. In a liquid crystal composite, plural volumes or droplets of a liquid crystal material are dispersed, encapsulated, embedded, or otherwise contained within a matrix material such as a polymer. Exemplary disclosures include Fergason, U.S. Pat. Nos. 4,435,047; West et al., 4,685,771; Pearlman, 4,992,201; and Dainippon Ink, EP 0,313,053, the disclosures of which are incorporated herein for all purposes.

The liquid crystal composite is disposed between electrodes, at least one of the electrodes typically being patterned to form a matrix. The electrodes are supported by substrates. When voltage is applied to a pair of electrodes, an electric field is created and the liquid crystal located between the electrodes will become transmissive. In this optical state incident light is transmitted through the composite. When the voltage to the pair of electrodes is switched off, the electric field no longer exists and the liquid crystal composite between the electrodes changes its optical state to one in which incident light is substantially scattered and/or absorbed. In this state the material will typically be opaque with a frosty appearance if scattering is predominant or dark gray if absorption is predominant. By individually controlling the voltage applied to each pair of electrodes in an electrode matrix, a graphical image may be generated. The electrode matrix can be transparent or reflective and is typically a matrix of thin film transistors (TFT), MOS transistors, MIM diodes, or crossed patterned electrodes. The graphical image can be viewed directly, projected onto a viewing screen, or viewed as a virtual image on the eye. By combining red, green, and blue images, either via sequential illumination, for example, using field-sequential color with red, green, and blue light or via dedicated red, green, and blue pixels, a colored image may be formed.

Regardless of the exact nature of the liquid crystal composite or of the intended application (e.g., reflective versus transmissive, direct viewing versus projection versus virtual image viewing, normal mode versus reverse mode, etc.), a high contrast display is desirable since it provides improved image definition and quality. A number of different displays have been designed in response to this need. For example, in U.S. Pat. No. 4,732,456 a display with enhanced contrast is disclosed in which a lens or reflector means is used to direct light transmitted by the display onto a light absorbing target.

U.S. Pat. No. 5,076,668 discloses a system for achieving a high brightness display with excellent contrast qualities. The disclosed system utilizes a gain reflector disposed behind a display medium comprised of a liquid crystal material. The gain reflector is preferably an offset gain reflector, thus angularly offsetting the specular reflection from the reflected gain.

Although there are various methods of achieving a high contrast liquid crystal display, typically additional elements are required, thus adding to the overall complexity and cost of the display panel. Therefore an improved high contrast liquid crystal display that is simple to manufacture is desired.

SUMMARY OF THE INVENTION

The present invention provides a reverse mode liquid crystal display of improved contrast. Image contrast is determined by the ratio of light from the display pixels that are in the on, ie., bright state to the light from the display pixels that are in the off, i.e., dark state. The present invention improves on the image contrast by selecting the illumination direction and the panel orientation in such a way as to minimize the amount of light entering the viewing field that is due to scattered and/or diffracted light from the fine features of the display panel.

A liquid crystal display panel is made up of a plurality of pixels of substantially uniform size, shape, and alignment. Due to the alignment of the pixel edges of the plurality of panel pixels, multiple pixel edge planes are formed For example, if the panel pixels are square, two orthogonal pixel edge planes will be formed. Similarly, if delta shaped panel pixels are used, three pixel edge planes will be formed, the planes being separated by 60 degrees.

In one aspect of the invention, the illumination is directed at a liquid crystal panel such that it is not aligned with a pixel edge plane, thereby reducing scattered and/or diffracted light from pixel edges and increasing the overall display contrast. Preferably the illumination is directed at the panel in a direction that is substantially equidistant from two adjacent pixel edge planes, thereby optimizing the image contrast Furthermore in at least one embodiment, the location of the illumination source is not normal to any portion of the display panel.

In another aspect of the invention, a liquid crystal display panel is illuminated by multiple sources. Preferably none of the illumination from the sources is aligned with a pixel edge plane. This aspect of the invention provides for improved brightness and illumination uniformity while achieving high contrast levels.

A further understanding of the nature and advantages of the present invention may be realized by reference to the remaining portions of the specification and the drawings.

DESCRIPTION OF THE SPECIFIC EMBODIMENTS

Figure 1:
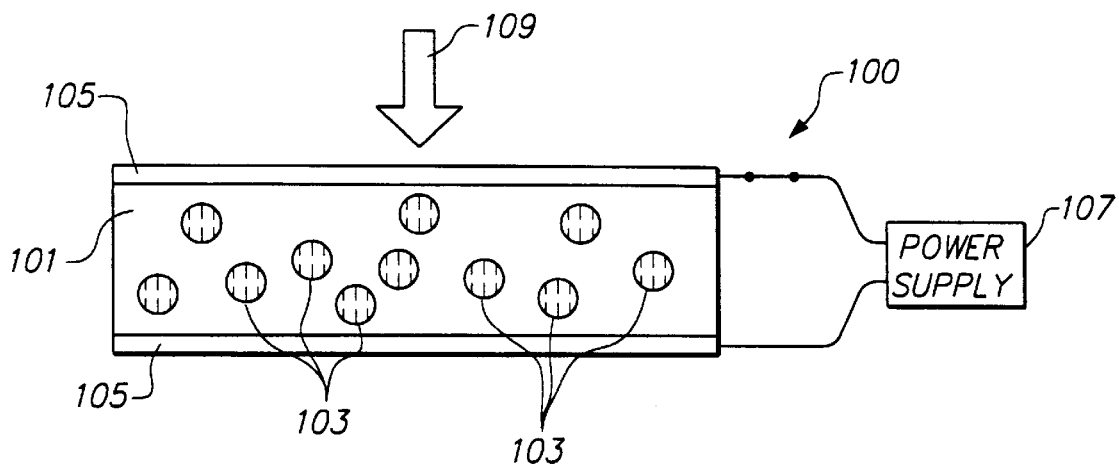
FIG. 1 is a cross-sectional view of a liquid crystal light valve in the on state according to the prior art.

Before describing the present invention in detail, several different configurations of liquid crystal displays according to the prior art will be described. FIG. 1 is a cross-sectional view of a typical liquid crystal display 100 according to the prior art A medium 101 (e.g., a polymer) containing a plurality of liquid crystal volumes or droplets 103 is sandwiched between a pair of electrodes 105 made of a transparent conductive material such as indium tin oxide. Droplets 103 may be individually encapsulated in one or more encapsulation layers as taught by Fergason, U.S. Pat. Nos. 4,435,047; Reamey et al., 5,405,551; and Havens et al., 5,585,947, the disclosures of which are incorporated herein. While the display is preferably made of encapsulated liquid crystal material, other types of liquid crystal displays, for example smectic A, cholesteric, or dynamic scattering nematic displays, may also be employed. Electrodes 105 are coupled to a voltage source 107.

When voltage source 107 is in an on state, a voltage is applied across electrodes 105 creating an electric field. Due to the positive dielectric anisotropy of liquid crystal droplets 103, the material comprising the droplets aligns parallel to the electric field as shown. In this state light incident along a path 109 will pass through droplets 103. Depending upon the thickness of the composite, the voltage applied to electrodes 105, and the transparency of electrodes 105, medium 101, and aligned droplets 103, transmission rates of 70% or greater may be achieved.

Figure 2:
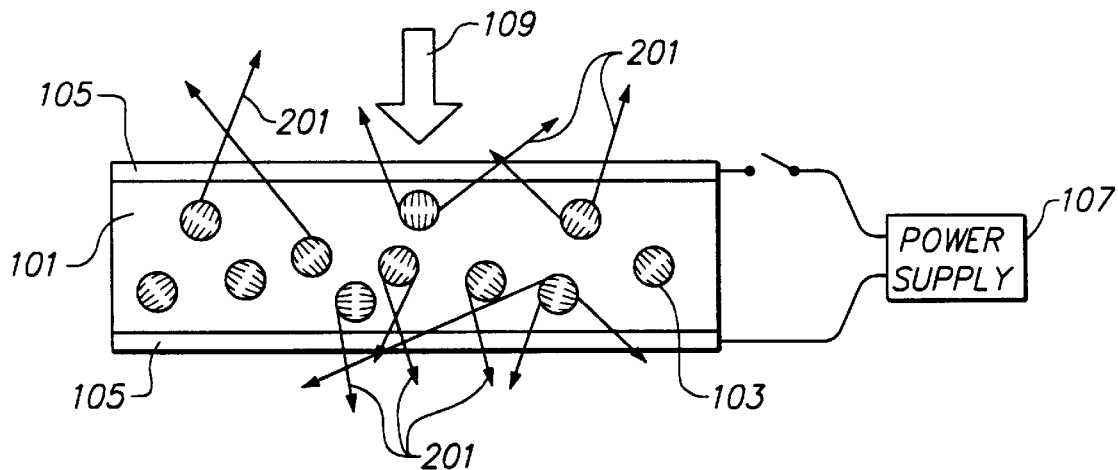
FIG. 2 is a cross-sectional view of the liquid crystal light valve of FIG. 1 in the off state.

When voltage source 107 is in an off state as illustrated in FIG. 2, the electric field between electrodes 105 is effectively zero. As a result, liquid crystal droplets 103 no longer are uniformly aligned. Due to the random orientation of droplets 103, light incident along path 109 is randomly scattered, both in a forward direction and a backward direction as illustrated by scatter paths 201. The scattering of the incident light causes display 100 to appear opaque or frosty.

Figure 3:
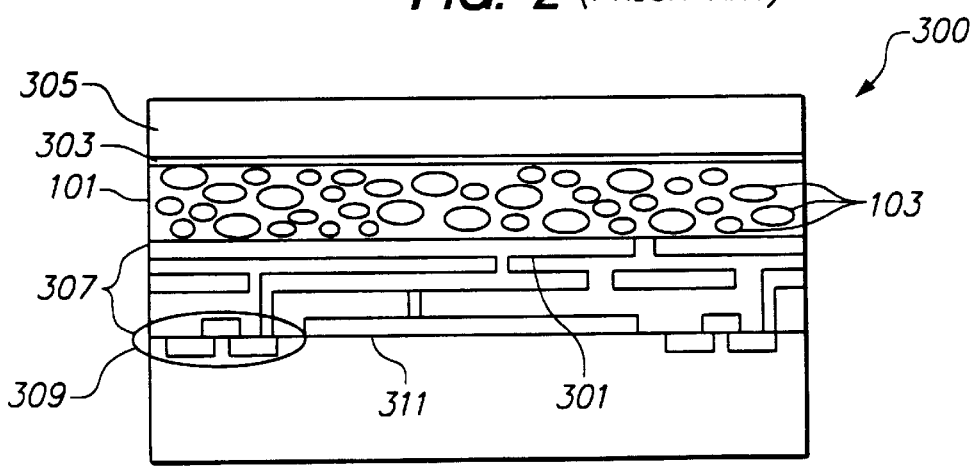
FIG. 3 is a sectional view of a liquid crystal display panel according to the prior art.

FIG. 3 is a cross-sectional view of a liquid crystal display panel 300 that may be used to display graphical information. As in liquid crystal display 100, panel 300 includes both medium 101 and liquid crystal volumes 103. In at least one embodiment, the liquid crystal composite comprising medium 101 and liquid crystal volumes 103 is a polymer dispersed liquid crystal (ie., a PDLC composite).

In marked contrast to display 100, panel 300 includes a plurality of bottom electrodes 301 and a common top electrode 303 to form a plurality of electrode pairs. The electrode pairs divide panel 300 into an array of separately controllable display elements or pixels. Panel 300 also includes a top support member 305, preferably made of a conductive transparent material such as indium tin oxide (i.e., ITO) coated polyethylene terephthalate or ITO coated glass. Depending upon the desired application, the display can be designed to be either reflective or transparent. If a reflective display is desired, the reflective coating may either be applied to a surface of a bottom support member 307 or to a surface of pixel electrodes 301. Preferably electrodes 301 are reflective electrodes made of aluminum or silver. While the panel configuration illustrated in FIG. 3 is common, it is understood that other configurations are well known by those of skill in the art and that this configuration is intended only to be illustrative, not limiting.

Electrically coupled to each electrode 301 is a switching element 309 that is used to control the application of a voltage across common electrode 303 and electrodes 301. Typically switching elements 309 are thin film transistors when display 300 is a transparent mode display and MOS transistors (as shown in FIG. 3) when display 300 is a reflective mode display. Switching elements 309 act as switches for each electrode "pair" thus allowing any combination of pixels to be activated. In general, panel 300 is designed so that the maximum voltage that appears for each pixel electrode is the threshold voltage of liquid crystal volumes 103. Although in the illustrated embodiment switching elements 309 are MOS transistors, other switching elements such as thin film transistors, MIMs, diodes, or varistors may be used as an alternative. The application of voltage across electrodes 301 and 303, and therefore the activation of individual pixels, is controlled by a processor. In some configurations, such as the MOS transistor configuration illustrated in FIG. 3, capacitive elements 311 are added to the transistor circuit in order to store charge.

Figure 4:
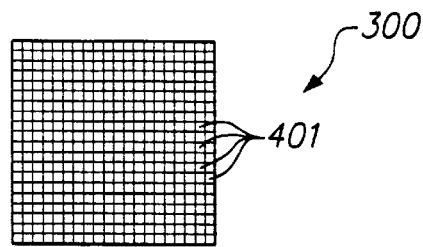
FIG. 4 is a top view of the liquid crystal display panel of FIG. 3.

FIG. 4 is a top view of panel 300. In the illustrated embodiment, panel 300 is comprised of a 20 by 20 array of square pixels 401. Panel 300 may be comprised, however, of greater or lesser numbers of pixels. Furthermore, the pixel shape is not limited to squares nor is the pixel shape limited to four sided configurations. Lastly, all of the pixels within the panel need not be of a uniform shape or size.

Liquid crystal display panels may be utilized in a variety of different configurations to create direct view, projection, and virtual images. Examples of direct view include computer monitor screens and instrument panel readouts. Examples of projection systems include front and rear systems projecting to a large screen or to a screen in a microdisplay. A virtual microdisplay typically consists of one or more light sources, a liquid crystal composite, electrode elements, and imaging optics that form a virtual image on the eye of the user. Additionally, liquid crystal displays may be designed to function in either a transmissive or a reflective mode.

Figure 5:
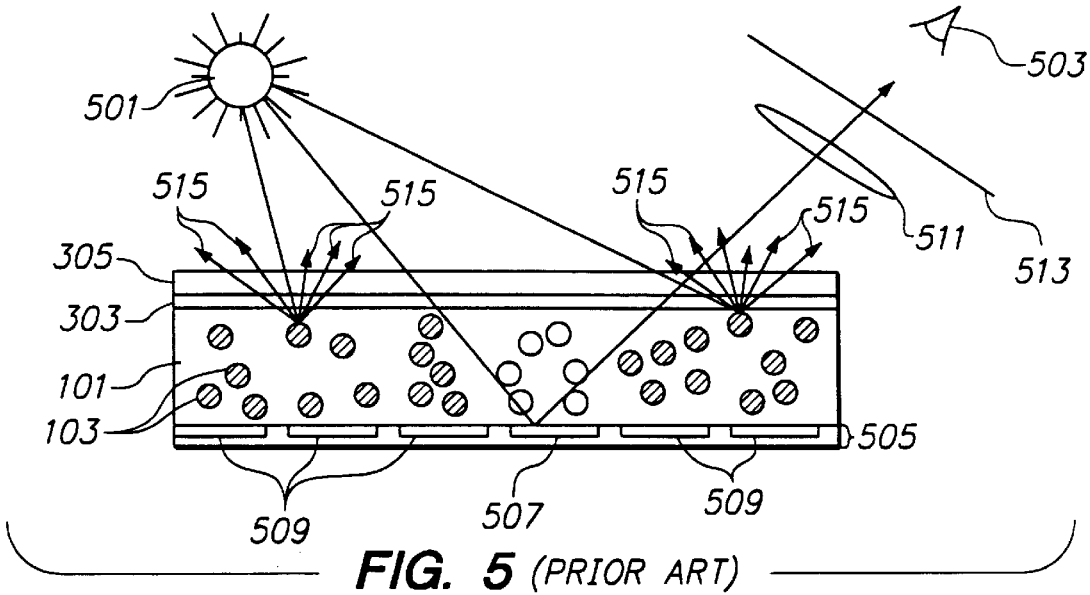
FIG. 5 is an illustration of a reflective liquid crystal display operating in the normal mode.

Basically there are two configurations in which a high contrast image can be formed; normal mode and reverse mode. In a normal mode configuration, the image is formed from the reflected, or transmitted, non-scattered light while the scattered light is blocked. FIG. 5 is an illustration of a reflective liquid crystal display operating in the normal mode. In this mode both the light source 501 and the viewer 503 are on the same side of the panel. As the illustrated panel is a reflective display, either bottom support member 505 is reflective or pixels 507 and 509 are reflective. The construction of reflective member 505 is well known in the art, see, for example, Rowland, U.S. Patent Nos. 3,935,359; Kuney, Jr., 4,957,335; Nelson et al., 4,938,563; Belisle et al., 4,725,494; Appledom et al., 4,775,219; Tung et al., 4,712, 219; Malek, 4,712,867; Benson, 4,703,999; Sick et al., 4,464,014; Nelson et al., 4,895,428; Hedblom, 4,988,541;

Schultz, 3,922,065; and Linder, 3,918,795; the disclosures of which are incorporated herein by reference.

As shown in FIG. 5, the pixels defined by electrodes 507 are in an on state, thereby causing the liquid crystal volumes in the pixels defined by these electrodes to become transparent. Due to the transparency of these pixels, light from source 501 (e.g., ambient light, directed light, etc.) will pass through the pixels and be reflected by substrate reflector 505 or, in an alternate configuration, by the reflective electrode. The reflected specular light forms a bright image at location 503, typically after first passing through imaging optics 511 and an aperture stop 513. The liquid crystal volumes in those pixels defined by non-activated electrodes 509 are scattered in multiple directions 515, only a fraction of which will pass through optics 511 and aperture stop 513 to reach viewing location 503.

Figure 6:
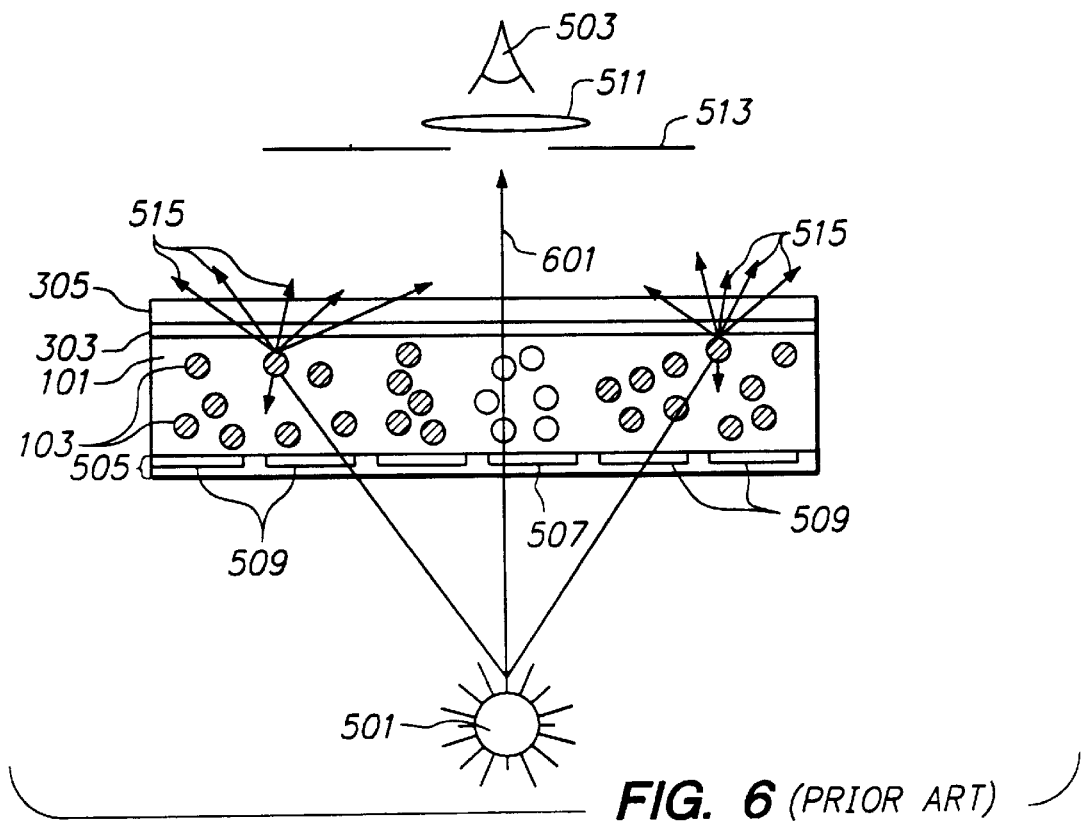
FIG. 6 is an illustration of a transmissive liquid crystal display operating in the normal mode.

In an alternate configuration of a normal mode display illustrated in FIG. 6, neither pixel electrodes 507 and 509 nor bottom substrate 505 are reflective. In this configuration the image is formed by the light transmitted through those pixels in the on state, i.e., pixels 507, as illustrated by exemplary light ray 601. As in the reflective configuration, only a fraction of scattered rays 515 will pass through aperture 513 and optics 511 to be imaged at location 503.

Figure 7:
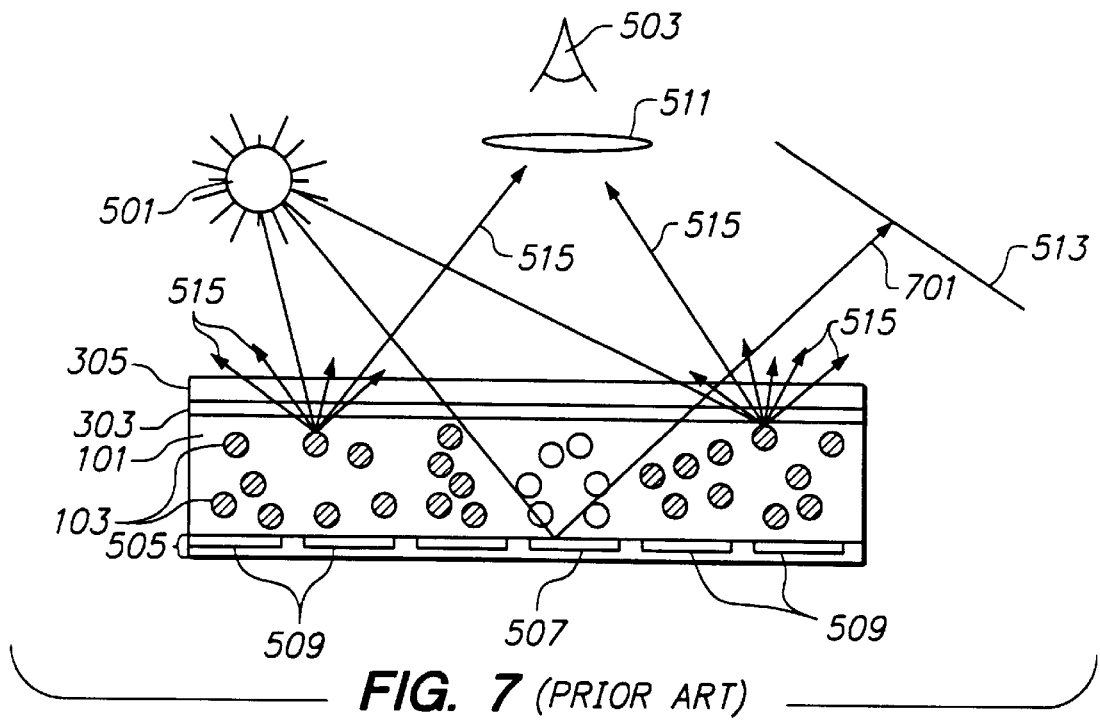
FIG. 7 is an illustration of a reflective liquid crystal display operating in the reverse mode.
Figure 8:
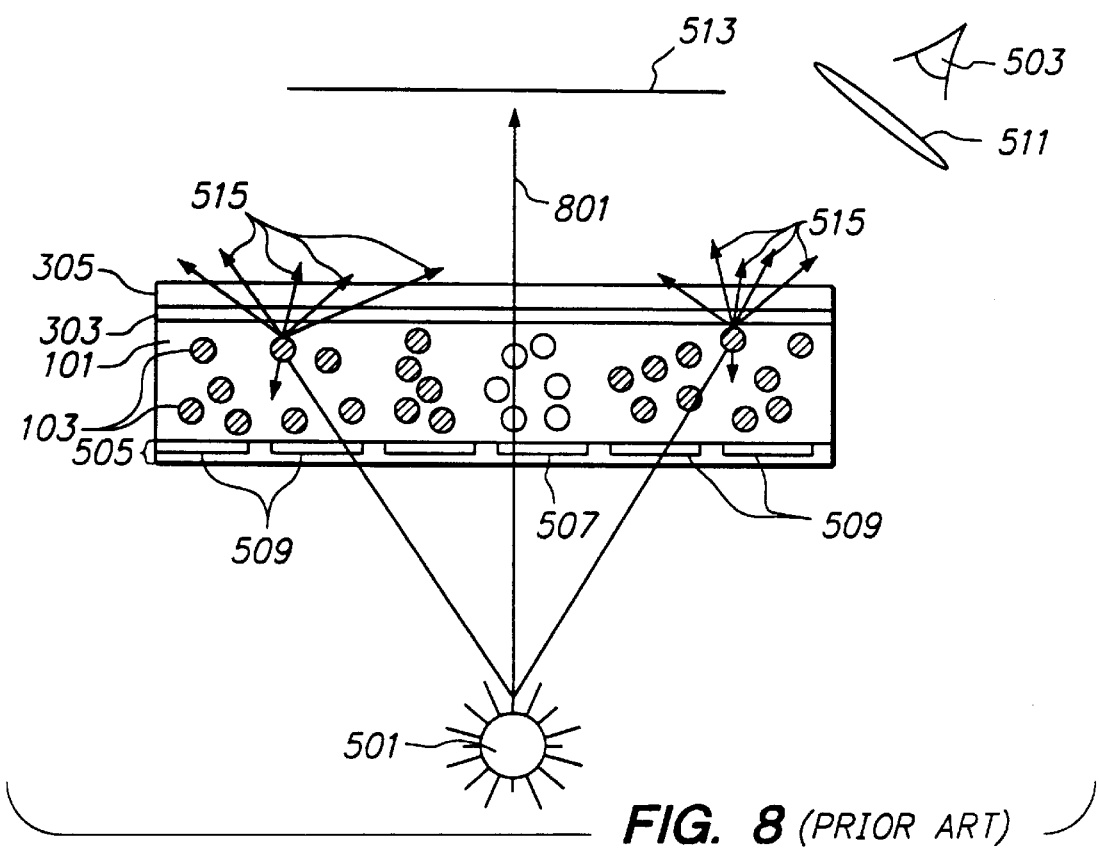
FIG. 8 is an illustration of a transmissive liquid crystal display operating in the reverse mode.

FIGS. 7 and 8 illustrate a display panel operating in the reverse mode. As noted above, a reverse mode panel may be used either in a reflective configuration (e.g., FIG. 7) or in a transparent configuration (e.g., FIG. 8). This panel is basically the same as that illustrated in FIGS. 5 and 6, respectively. However in this configuration it is the scattered light 515 that is collected by imaging optics 511 to form an image at location 503. The specular light, either reflected as shown by an exemplary light ray 701 or passing through the display in the case of a transparent configuration as shown by an exemplary light ray 801, is blocked with stop 513. A dark image is formed by those pixels 507 in an on state.

Besides the prior art display panel configurations illustrated above, there are numerous other configurations that are well known by those of skill in the art. Furthermore, liquid crystal display panels may also be used to produce color images. For example, either pleochroic or isotropic dyes may be included within the liquid crystal material, thereby achieving a colored visual effect. Alternatively, colored filters or colored source light may be used in conjunction with the liquid crystal displays to provide a colored image. By sequentially combining multiple colored images, for example, red, green, and blue images, an image of good color purity may be produced. See, for example, Jones, U.S. Pat. No. 5,398,081, the disclosure of which is incorporated herein.

The present invention will now be described in more detail. It has been discovered that the contrast ratio of an image formed by a liquid crystal display is reduced by the scattering and/or diffraction effects of a display panel, particularly those effects associated with the fine periodic structure (i.e., pixel edges) of the panel matrix. A reduction in the contrast ratio results in a reduction in the overall image quality. Image contrast is determined by the ratio of light from the pixels in the on state to that from the pixels in the off state.

In the method of the present invention, the scattering and/or diffraction effects of the display panel edges are minimized, thereby increasing the contrast ratio. Specifically, the illumination direction and the panel orientation are selected such that a minimum amount of scattered/diffracted light enters the viewing field. Regardless of the liquid crystal display configuration utilized, preferably the displayed image is of high contrast, thus improving the image quality.

Figure 9:
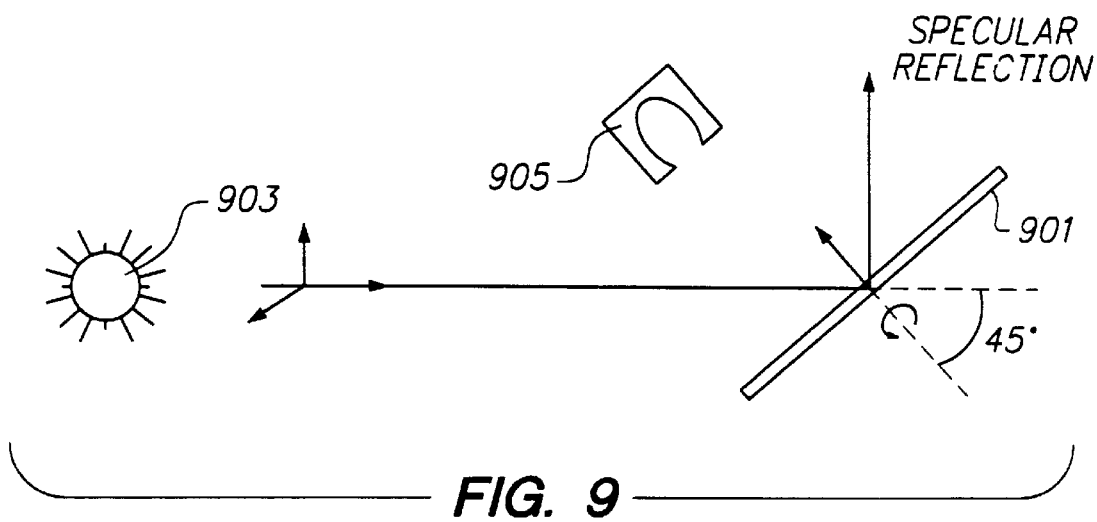
FIG. 9 is an illustration of a testing system used to verify the benefits of the present invention on a test panel.

FIG. 9 is an illustration of a testing system used to verify the benefits of the present invention on a test panel 901. Test panel 901 is comprised of an approximately 2 micrometer thick liquid crystal display with square pixels of approximately 28 micrometers per side in a configuration such as that illustrated in FIG. 4. A near collimated halogen light source 903 illuminates test panel 901 at an angle of 45 degrees from the panel normal. An integrating sphere 905 normal to test panel 901 measures the reflected light from panel 901, integrating sphere 905 having an f-number of 3.5.

Figure 10:
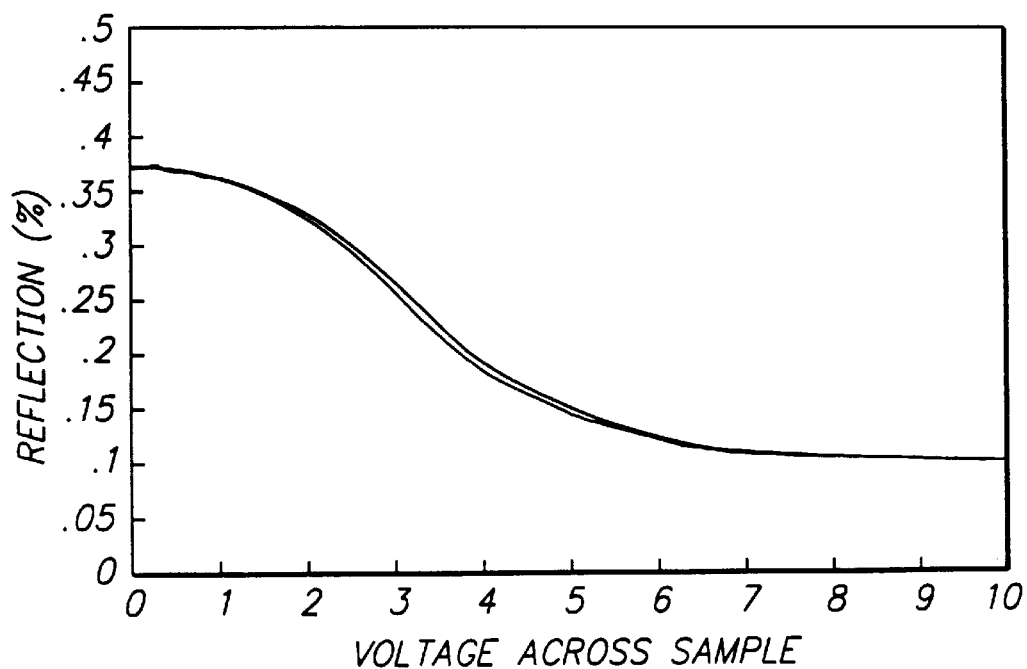
FIG. 10 is a graph of the reflectance of a test panel as a function of the applied voltage, the test panel oriented such that the plane of the illumination source is aligned with the pixel edges.
Figure 11:
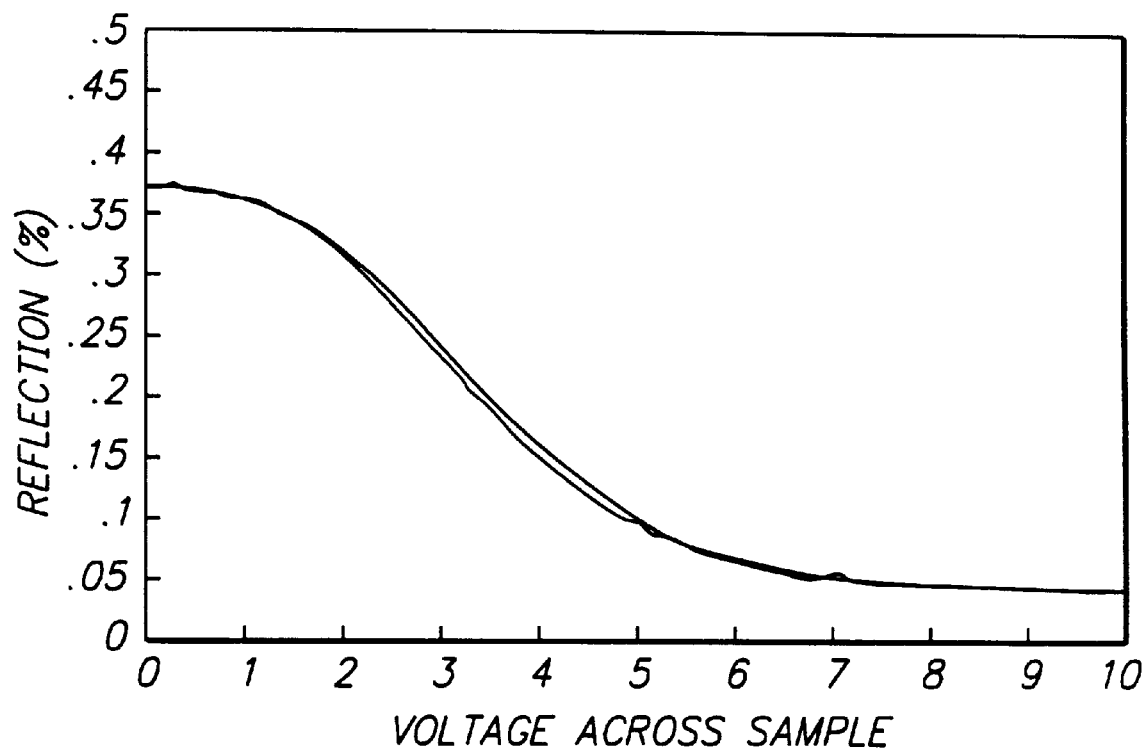
FIG. 11 is a graph of the reflectance of a test panel as a function of the applied voltage, the test panel oriented such that the plane of the illumination source is not aligned with edges.
Figure 12:
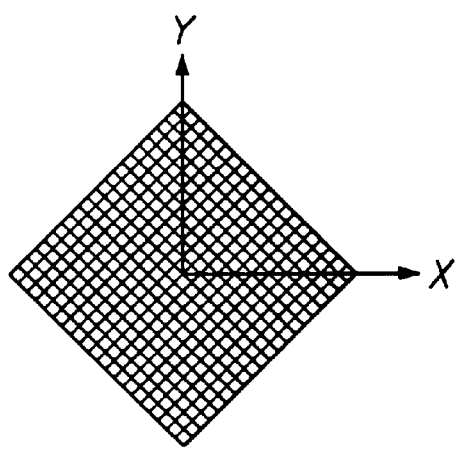
FIG. 12 is an illustration of the orientation of the test panel of FIG. 11.

FIGS. 10 and 11 are graphs of the reflectance of test panel 901 as a function of the applied voltage. In FIG. 10 the pixel edges of display 901 are aligned along the x and y-axes of the system while in FIG. 11 the display has been rotated 45 degrees around the panel normal as illustrated in FIG. 12. Defining the contrast ratio in terms of the reflectance at 0 volts versus the reflectance at 5 volts, the contrast ratio for the rotated panel (i.e., FIG. 11) is approximately 50 percent improved over the non-rotated panel. Even more striking is the contrast ratio defined by the reflectance at 0 volts versus the reflectance at 10 volts. Using this contrast ratio, an improvement of approximately 100 percent is achieved by rotating the panel 45 degrees. Similar advantages to rotating the panel are obtained if the panel is being used in the transmissive mode.

Figure 13:
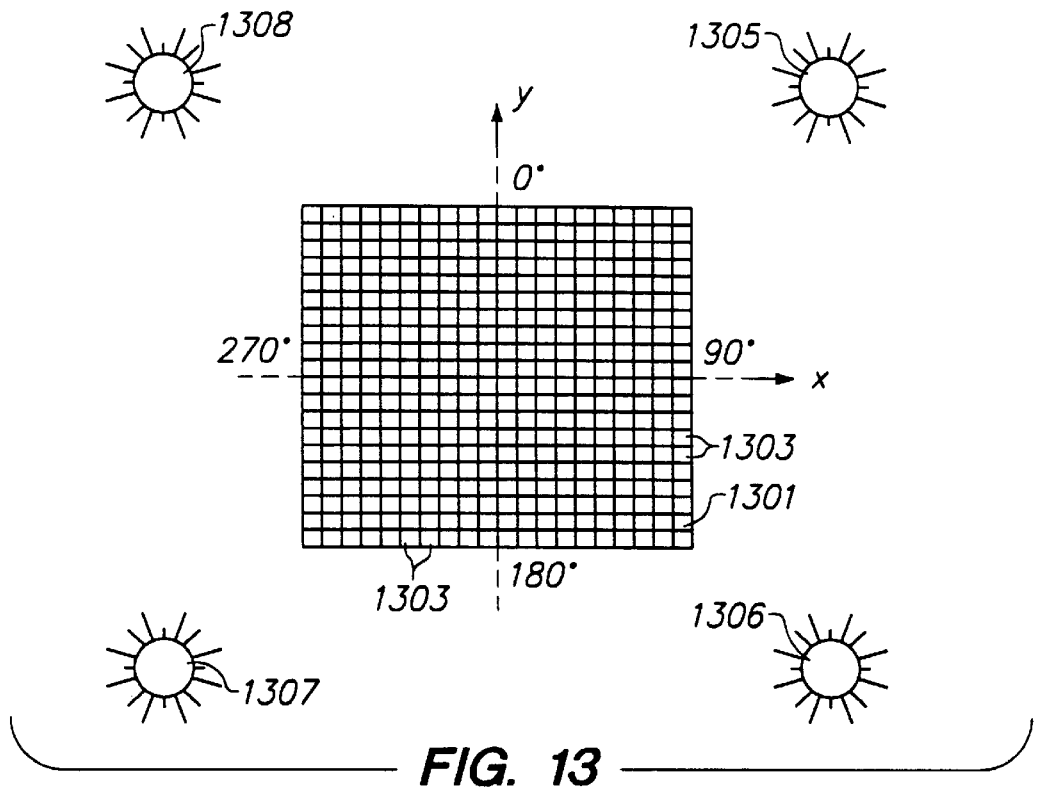
FIG. 13 is an illustration of a liquid crystal display panel in which the pixels are approximately rectangular in shape.

Therefore in one aspect of the invention, the illumination is directed at the liquid crystal panel, either in the reflective or transmissive mode, such that it is not aligned with a pixel edge. To further illustrate this aspect of the invention, FIG. 13 shows a display panel 1301 comprised of a plurality of pixels 1303. Pixels 1303 may be either square or rectangular shaped with pixel edges aligned along the x and y-axes. Assuming a z-axis perpendicular to the plane of the figure and given the 0, 90, 180, and 270 degree directions as indicated, a light source that is in the y-z (i.e., 0° or 180°) or x-z (i.e., 90° or 270°) planes will provide the worst contrast ratios. The optimum contrast ratio is achieved with the light source oriented at 45, 135, 225, and 315 degrees, i.e., positions 1305–1308, respectively. As a light source is re-oriented, becoming closer and closer to a pixel edge, the contrast ratio becomes increasingly worse.

Figure 14:
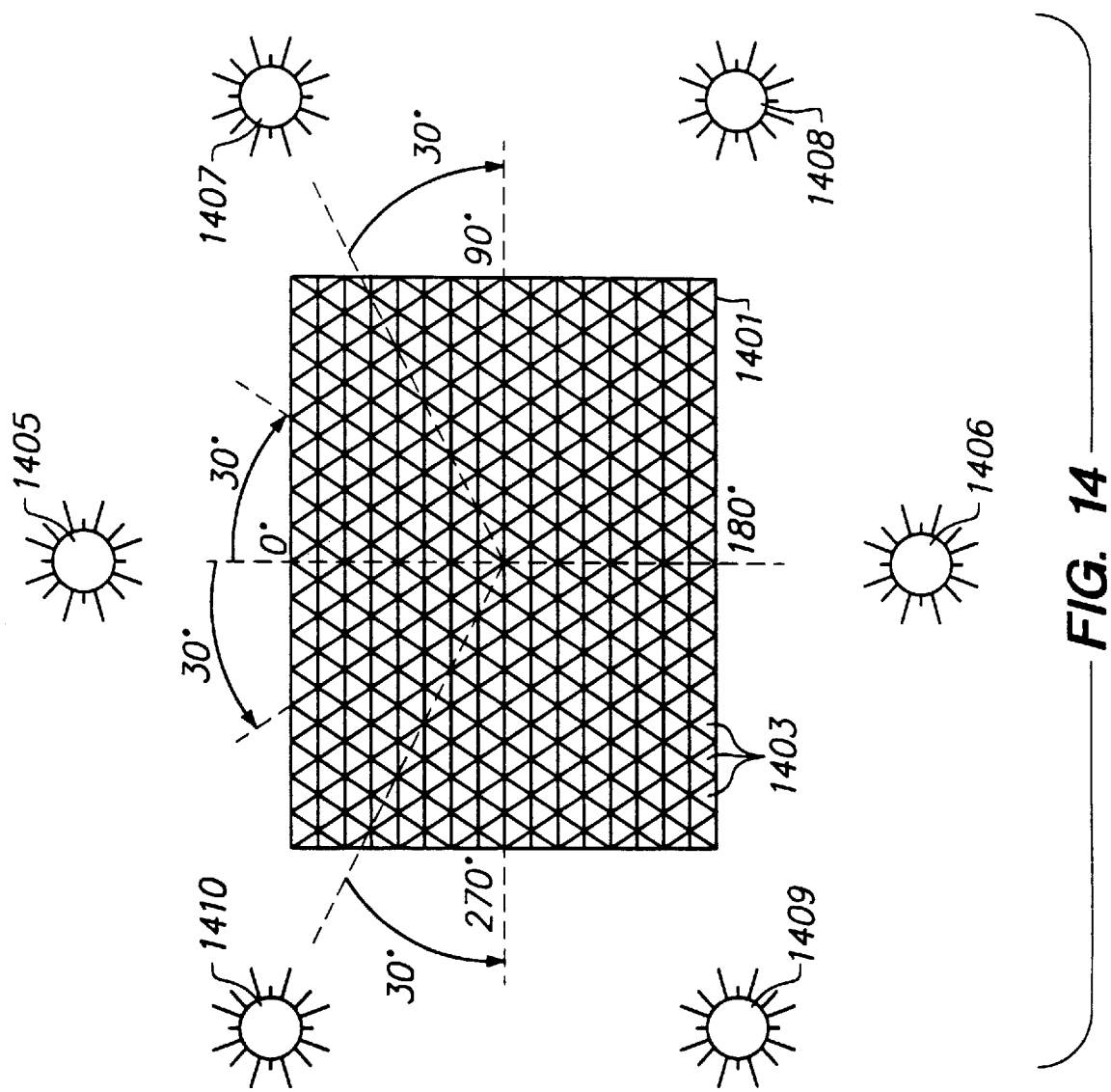
FIG. 14 is an illustration of a liquid crystal display panel in which the pixels have a delta shape.

FIG. 14 illustrates the application of the present invention to a liquid crystal display panel 1401 in which the pixels 1403 have delta shape. In this configuration the edges of the pixels are aligned along the x-axis, +30 degrees off of the y-axis, and −30 degrees off of the y-axis. Therefore the poorest contrast is achieved when the light source is aligned with any of these three pixel edges. Optimum performance is achieved when the light source is oriented along the y-axis (i.e., at a position 1405 or 1406) or oriented ±60 degrees off of the y-axis (i.e., at a position 1407–1410).

Figure 15:
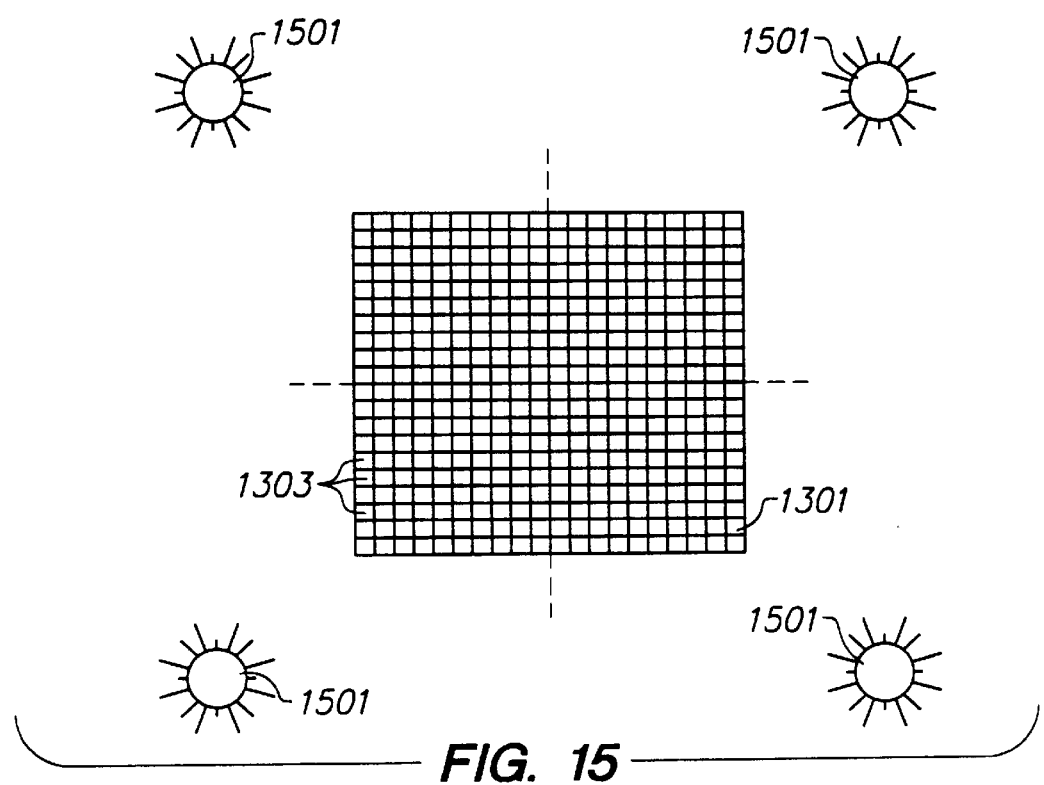
FIG. 15 is an illustration of a liquid crystal display panel illuminated by multiple sources in accordance with the present invention.

In an alternate embodiment of the invention illustrated in FIG. 15, a liquid crystal panel such as that shown in FIG. 13 is illuminated by multiple sources 1501. The multiple source configuration may be used with a panel in either the transmissive or the reflective mode and with any pixel shape (see, for example, FIGS. 13–14). Although four sources are shown, it is understood that both fewer and greater numbers of sources may be used depending upon the desired panel brightness. In addition to increasing brightness levels, multiple sources also increase illumination uniformity across the display panel. In accordance with the invention, each source is directed at panel 1301 in such a manner as to minimize scatter/diffraction effects from pixel edges. Thus in the embodiment shown, sources 1501 are located at 45, 135, 225, and 315 degrees.

As will be understood by those familiar with the art, the present invention may be embodied in other specific forms without departing from the spirit or essential characteristics thereof For example, the invention may be used with a variety of different liquid crystal materials, display panel designs, pixel sizes, pixel shapes, and electrode configurations. Furthermore, the invention is not restricted to either transmissive or reflective systems nor is the invention limited to a specific number of illumination sources. Accordingly, the disclosures and descriptions herein are intended to be illustrative, but not limiting, of the scope of the invention which is set forth in the following claims.

What is claimed is:

1. A high contrast liquid crystal display panel, comprising a light source illuminating said liquid crystal display panel, said liquid crystal display panel comprised of a plurality of pixels, wherein each pixel of said plurality of pixels includes multiple edges, wherein said multiple edges of said plurality of pixels are substantially aligned to form multiple pluralities of aligned edges, wherein said light source is not aligned with any of said muliple pluralities of aligned edges.

2. The high contrast liquid crystal display panel of claim 1, wherein said liquid crystal display panel is suitable for use as a reflective display.

3. The high contrast liquid crystal display panel of claim 1, wherein said liquid crystal display panel is suitable for use as a transmissive display.

4. The high contrast liquid crystal display panel of claim 1, wherein said liquid crystal display panel is suitable for use in a color display.

5. The high contrast liquid crystal display panel of claim 1, wherein said plurality of pixels define a pixel plane, wherein said light source is not positioned normal to any portion of said liquid crystal display.

6. The high contrast liquid crystal display panel of claim 1, wherein said light source is aligned substantially equidistant between two of said multiple pluralities of aligned edges.

7. The high contrast liquid crystal display panel of claim 1, wherein said plurality of pixels are selected from the group of pixel shapes consisting of 3-sided pixels, 4-sided pixels, 5-sided pixels, and 6-sided pixels.

8. The high contrast liquid crystal display panel of claim 1, wherein said plurality of pixels are selected from the group of pixel shapes consisting of squares, rectangles, diamonds, and deltas.

9. The high contrast liquid crystal display panel of claim 1, further comprising a second light source, wherein said second light source is not aligned with any of said multiple pluralities of aligned edges.

10. The high contrast liquid crystal display panel of claim 1, wherein a viewing position is located substantially normal to said liquid crystal display panel.

11. The high contrast liquid crystal display panel of claim 1, wherein said liquid crystal display is a reverse mode display.

12. A high contrast liquid crystal display, comprising:
   a plurality of liquid crystal volumes within a containment matrix;
   at least one electrode proximate to a first side of said containment matrix;
   at least one electrode proximate to a second side of said containment matrix, wherein a plurality of electrode pairs defining a plurality of pixels are formed by said at least one electrode proximate to said first side and said at least one electrode proximate to said second side of said containment matrix, said plurality of electrode pairs defining multiple pluralities of aligned electrode edges, wherein said plurality of pixels define a pixel plane; and
   at least one light source aligned substantially equidistant from two different planes defined by two of said multiple pluralities of aligned electrode edges.

13. The high contrast liquid crystal display of claim 12, wherein said at least one light source is not positioned normal to any portion of said liquid crystal display.

14. The high contrast liquid crystal display of claim 12, wherein said plurality of pixels are selected from the group of pixel shapes consisting of 3-sided pixels, 4-sided pixels, 5-sided pixels, and 6-sided pixels.

15. The high contrast liquid crystal display of claim 12, wherein said plurality of liquid crystal volumes contain a dye.

16. The high contrast liquid crystal display of claim 12, wherein said at least one light source is located on a viewing side of said liquid crystal display.

17. The high contrast liquid crystal display of claim 12, wherein said at least one light source is located on a non-viewing side of said liquid crystal display.

18. The high contrast liquid crystal display of claim 12, wherein a viewing position is located substantially normal to said liquid crystal display panel.

19. The high contrast liquid crystal display of claim 12, wherein said liquid crystal display is a reverse mode display.

20. A method of illuminating a liquid crystal display comprised of a plurality of pixels, the method comprising the steps of:
   positioning a light source at a location substantially equidistant from a first plane and a second plane, wherein said first plane is defined by a first plurality of pixel edges and wherein said second plane is defined by a second plurality of pixel edges; and
   illuminating said liquid crystal display with said light source.

21. The method of claim 20, further comprising the steps of:
   positioning a second light source at a location substantially equidistant from said first plane and said second plane; and
   illuminating said liquid crystal display with said second light source.

22. The method of claim 20, further comprising the steps of:
   positioning a second light source at a location substantially equidistant from said first plane and a third plane, wherein said third plane is defined by a third plurality of pixel edges; and
   illuminating said liquid crystal display with said second light source.

23. The method of claim 20, wherein said location of said light source is not normal to any portion of said liquid crystal display.

* * * * *